(12) United States Patent
Honda et al.

(10) Patent No.: US 10,665,367 B2
(45) Date of Patent: May 26, 2020

(54) OXIDE SUPERCONDUCTING WIRE

(71) Applicant: SUMITOMO ELECTRIC INDUSTRIES, LTD., Osaka-shi, Osaka (JP)

(72) Inventors: Genki Honda, Osaka (JP); Tatsuoki Nagaishi, Osaka (JP); Masaya Konishi, Osaka (JP); Kotaro Ohki, Osaka (JP); Takashi Yamaguchi, Osaka (JP); Tatsuhiko Yoshihara, Osaka (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 15/767,420

(22) PCT Filed: Jul. 12, 2016

(86) PCT No.: PCT/JP2016/070578
§ 371 (c)(1),
(2) Date: Apr. 11, 2018

(87) PCT Pub. No.: WO2017/064893
PCT Pub. Date: Apr. 20, 2017

(65) Prior Publication Data
US 2018/0301248 A1 Oct. 18, 2018

(30) Foreign Application Priority Data
Oct. 15, 2015 (JP) .................................. 2015-203745

(51) Int. Cl.
*H01B 12/06* (2006.01)
*H01F 6/06* (2006.01)
(Continued)

(52) U.S. Cl.
CPC ............... *H01B 12/06* (2013.01); *C01G 1/00* (2013.01); *C01G 3/00* (2013.01); *C01G 3/006* (2013.01);
(Continued)

(58) Field of Classification Search
CPC . H01B 12/06; C01G 1/00; C01G 3/00; C01G 3/006; H01F 6/06; C01P 2006/40; Y02E 40/642
See application file for complete search history.

(56) References Cited

U.S. PATENT DOCUMENTS

2007/0238619 A1* 10/2007 Xiong ................. H01L 39/2461
505/100
2010/0160170 A1 6/2010 Horimoto et al.
(Continued)

FOREIGN PATENT DOCUMENTS

| JP | 2012-248469 A | 12/2012 |
|---|---|---|
| WO | WO-2008/023782 A1 | 2/2008 |
| WO | WO-2010/055651 A1 | 5/2010 |

*Primary Examiner* — Paul A Wartalowicz
(74) *Attorney, Agent, or Firm* — Faegre Drinker Biddle & Reath LLP

(57) ABSTRACT

An oxide superconducting wire includes an oriented metal substrate, an intermediate layer formed on the oriented metal substrate, and an oxide superconducting layer formed on the intermediate layer. The oriented metal substrate has an in-plane orientation $\Delta\phi$ of 7° or less. The intermediate layer is formed of a single layer.

10 Claims, 8 Drawing Sheets

(51) Int. Cl.
*C01G 3/00* (2006.01)
*C01G 1/00* (2006.01)

(52) U.S. Cl.
CPC ............ H01F 6/06 (2013.01); *C01P 2006/40* (2013.01); *Y02E 40/642* (2013.01)

(56) References Cited

U.S. PATENT DOCUMENTS

2011/0319271 A1* 12/2011 Selvamanickam ... H01L 39/143
505/231
2012/0040840 A1 2/2012 Okayama et al.

* cited by examiner

OXIDE SUPERCONDUCTING WIRE

TECHNICAL FIELD

The present invention relates to oxide superconducting wires.

This application claims priority to Japanese Patent Application No. 2015-203745 filed on Oct. 15, 2015, the entire contents of which are incorporated herein by reference.

BACKGROUND ART

Japanese Patent Laying-Open No. 2012-248469 (PTD 1) describes an oxide superconducting wire including an oriented metal substrate, an intermediate layer formed on the oriented metal substrate, and an oxide superconducting layer formed on the intermediate layer.

CITATION LIST

Patent Document

PTD 1: Japanese Patent Laying-Open No. 2012-248469

SUMMARY OF INVENTION

An oxide superconducting wire of the present disclosure includes an oriented metal substrate, an intermediate layer formed on the oriented metal substrate, and an oxide superconducting layer formed on the intermediate layer. The oriented metal substrate has an in-plane orientation ($\Delta\phi$) of 7° or less. The intermediate layer is formed of a single layer.

DESCRIPTION OF EMBODIMENTS

Figure 1:
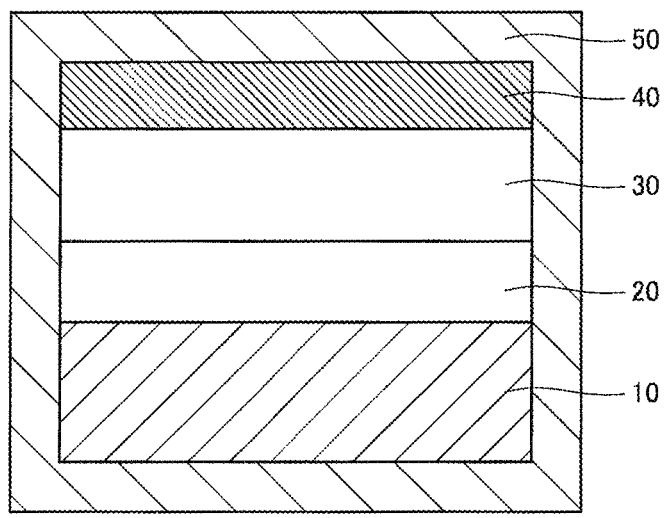
FIG. 1 is a schematic sectional view showing an arrangement of an oxide superconducting wire according to an embodiment.

[Problems to be Solved by the Present Disclosure]

According to the oxide superconducting wire described in PTD 1, the orientation of the oxide superconducting layer can be improved by interposing the intermediate layer between the oriented metal substrate and the oxide superconducting layer. Here, the "orientation" refers to the degree to which the crystal orientations of crystal grains are aligned. Furthermore, the diffusion and reaction of elements between the substrate and the oxide superconducting layer can be suppressed. As a result, excellent properties such as a high critical current density (Jc) and a high critical current (Ic) can be obtained.

In the oxide superconducting wire described in PTD 1, however, a plurality of layers are stacked on the oriented metal substrate to form the intermediate layer, in order to obtain an intermediate layer with a good orientation. As such an intermediate layer, a three-layer structure formed of $CeO_2$ (ceria)/YSZ (yttria-stabilized zirconia)/$Y_2O_3$ (yttria), for example, is often employed. Thus, a step of forming the intermediate layer on the oriented metal substrate requires a plurality of film formation processes corresponding to the above-described plurality of layers, thus adding to manufacturing cost.

Accordingly, an object of the present disclosure is to provide an oxide superconducting wire allowing for reduced manufacturing cost while maintaining excellent superconducting properties.

[Effects of the Present Disclosure]

According to the present disclosure, an oxide superconducting wire allowing for reduced manufacturing cost while maintaining excellent superconducting properties can be realized.

[Description of Embodiment of the Present Invention]

First, an embodiment of the present invention will be listed and described.

(1) An oxide superconducting wire 1 according to one embodiment of the present invention (see FIG. 1) includes an oriented metal substrate 10, an intermediate layer 20 formed on oriented metal substrate 10, and an oxide superconducting layer 30 formed on intermediate layer 20. Oriented metal substrate 10 has an in-plane orientation ($\Delta\phi$) of 7° or less. Intermediate layer 20 is formed of a single layer. In the present specification, the in-plane orientation of oriented metal substrate 10 can be determined by X-ray diffraction (XRD), from the full width at half maximum (FWHM) of a peak obtained by $\phi$ scan of a (111) plane of oriented metal substrate 10.

According to oxide superconducting wire 1 in accordance with (1) above, since oriented metal substrate 10 has a good orientation, intermediate layer 20 formed on oriented metal substrate 10 can have a good orientation. Accordingly, a good orientation can be obtained even with intermediate layer 20 formed of a single layer. As a result, oxide superconducting layer 30 formed on intermediate layer 20 also has a good orientation, whereby excellent superconducting properties can be obtained.

Furthermore, according to oxide superconducting wire 1, since intermediate layer 20 formed of a single layer can be formed with a good orientation, the thickness of intermediate layer 20 can be reduced compared to that of a conventional oxide superconducting wire. The manufacturing cost can thereby be reduced. As a result, an oxide superconducting wire allowing for reduced manufacturing cost while maintaining excellent superconducting properties can be realized.

Oriented metal substrate 10 may more preferably have an in-plane orientation $\Delta\phi$ of 6° or less.

(2) Preferably, in oxide superconducting wire 1 according to (1) above, oriented metal substrate 10 is a clad substrate. As such an oriented metal substrate, for example, a clad substrate having a stacked structure of NiW/SUS, or a clad substrate having a stacked structure of Ni/Cu/SUS can be used. Accordingly, a superconducting property (Ic) can be improved with the same thickness of the intermediate layer, as compared to an oxide superconducting wire in which a Ni—W alloy substrate is used as the oriented metal substrate.

(3) Preferably, in oxide superconducting wire 1 according to (1) above, intermediate layer 20 has a thickness of 10 nm or more. Accordingly, intermediate layer 20 formed of a single layer can be formed with a good orientation. Intermediate layer 20 more preferably has a thickness of 200 nm or less. Accordingly, the manufacturing cost can be reduced while a good orientation of oxide superconducting layer 30 is achieved.

(4) Preferably, in oxide superconducting wire 1 according to any one of (1) to (3) above, intermediate layer 20 has an in-plane orientation $\Delta\phi$ of 8° or less. Accordingly, since intermediate layer 20 formed of a single layer has a good orientation, oxide superconducting layer 30 formed on intermediate layer 20 can have a good orientation.

The in-plane orientation of intermediate layer 20 is preferably equal to or greater than the in-plane orientation of oriented metal substrate 10. That the in-plane orientation is equal to or greater means that $\Delta\phi$ of intermediate layer 20 is equal to or smaller than $\Delta\phi$ of oriented metal substrate 10. A value obtained by dividing the difference between $\Delta\phi$ of intermediate layer 20 and $\Delta\phi$ of oriented metal substrate 10 by $\Delta\phi$ of oriented metal substrate 10, expressed in percentage, is preferably 15% or less.

(5) Preferably, in oxide superconducting wire 1 according to any one of (1) to (4) above (see FIG. 8), oriented metal substrate 10 may include an oxide layer 11 at a top portion in contact with intermediate layer 20.

[Details of Embodiment of the Present Invention]

The embodiment of the present invention will now be described based on the drawings. In the following drawings, the same or corresponding parts are designated by the same reference numbers and description thereof will not be repeated.

(Arrangement of Oxide Superconducting Wire)

FIG. 1 is a schematic sectional view showing an arrangement of an oxide superconducting wire according to the embodiment. FIG. 1 shows a cross section cut along a direction intersecting a direction in which an oxide superconducting wire 1 according to the embodiment extends. Thus, a direction intersecting the sheet of the drawing is the longitudinal direction of oxide superconducting wire 1, and a superconducting current of oxide superconducting layer 30 flows along a direction intersecting the cross section. Although the difference in length between a vertical direction (hereinafter also referred to as "thickness direction") and a horizontal direction (hereinafter also referred to as "width direction") in the rectangular cross section is reduced for visual clarity in FIG. 1 and subsequent schematic sectional views, the length in the thickness direction of the cross section is actually sufficiently smaller than the length in the width direction.

Referring to FIG. 1, oxide superconducting wire 1 according to the embodiment is long-shaped (in the form of a tape) and rectangular in cross section, and in this case, has a relatively large surface extending in the longitudinal direction of the long shape as a main surface. Oxide superconducting wire 1 includes an oriented metal substrate 10 having an oriented and crystallized surface, an intermediate layer 20, oxide superconducting layer 30, a protective layer 40, and a stabilizing layer 50.

Oriented metal substrate 10 means a substrate in which crystal orientations are aligned in a biaxial direction in a plane of the substrate surface. As oriented metal substrate 10, an alloy made of two or more metals of nickel (Ni), copper (Cu), chromium (Cr), manganese (Mn), cobalt (Co), iron (Fe), palladium (Pd), silver (Ag), tungsten (W), and gold (Au), for example, is suitably used. These metals may be stacked with another metal or alloy.

Oriented metal substrate 10 may be formed, for example, by bonding an orientated metal layer to the surface of the substrate. The substrate is non-oriented and non-magnetic, and has a higher strength than that of the orientated metal layer. As the substrate, SUS (stainless steel), a Ni-based alloy and the like are used, for example. Examples of a material for the orientated metal layer include, but are not limited, to, Ni, NiW (nickel tungsten) and Cu (copper). When Cu is used as a material for the orientated metal layer, a coating layer made of Ni or the like may be formed on a surface of the orientated metal layer by a method such as plating in a step after the oriented metal substrate has been obtained, so as to prevent oxidation of the Cu forming the orientated metal layer.

As such oriented metal substrate 10, a clad substrate having a stacked structure of NiW/SUS, or a clad substrate having a stacked structure of Ni/Cu/SUS can be used, for example. The strength of the oriented metal substrate can thereby be improved as compared to an example of an elemental orientated metal layer. Furthermore, a good orientation can be obtained since the substrate and the orientated metal layer are bonded together. As a result, oriented metal substrate 10 having a good orientation and high strength can be obtained. Oriented metal substrate 10 preferably has an in-plane orientation $\Delta\phi$ of 7° or less.

Intermediate layer 20 is formed on oriented metal substrate 10. Intermediate layer 20 is formed of a single layer. A material forming intermediate layer 20 is preferably an oxide having a crystal structure of any one of rock salt type, fluorite type, perovskite type and pyrochlore type. Examples of an oxide having such a crystal structure include: rare earth element oxides such as $CeO_2$ (ceria), $Ho_2O_3$ (holmium oxide), $Yb_2O_3$ (ytterbium oxide); oxides such as YSZ (yttria-stabilized zirconia), MgO (magnesium oxide), $Al_2O_3$ (aluminum oxide); $ABO_3$ perovskite type compounds (A is one or more types of elements selected from Ca, Ba, Sr and lanthanoid elements; B is one or more types of elements selected from Ti, Cr, Mn, Fe, Co, Ni, Zr, Nb, Mo and Gd; O is oxygen) such as $SrTiO_3$ (strontium titanate), $BaZrO_3$ (barium zirconate), $LaMnO_3$. In particular, $Y_2O_3$, $SrTiO_3$, $LaMnO_3$ and the like are suitably used in terms of crystal constant and crystal orientation.

These materials have extremely low reactivity with oxide superconducting layer 30, and do not degrade the superconducting properties of oxide superconducting layer 30 even at an interface in contact with oxide superconducting layer 30. These materials can also perform, when forming oxide superconducting layer 30 at high temperature, the function of preventing the diffusion of elements from oriented metal substrate 10 to oxide superconducting layer 30. The material forming intermediate layer 20 is not particularly limited to these materials. Intermediate layer 20 preferably has a good orientation. For example, intermediate layer 20 preferably has an in-plane orientation $\Delta\phi$ of 8° or less.

Oxide superconducting layer 30 is formed on intermediate layer 20. A material for oxide superconducting layer 30 is preferably a RE123-based oxide superconductor, for example. The RE123-based oxide superconductor means a superconductor expressed by a composition formula of $REBa_2Cu_3O_y$. In this composition formula, RE represents one type, or two or more types of rare earth elements such as Y (yttrium), Gd (gadolinium), Sm (samarium), Ho (holmium), La (lanthanum), Nd (neodymium), Eu (europium), Dy (dysprosium), Er (erbium), Yb (ytterbium) and Lu (lutetium). Y is between 6 and 8, and more preferably between 6.8 and 7. To improve the Ic, oxide superconducting layer 30 preferably has a thickness of 1 to 5 µm.

Protective layer 40 is formed on oxide superconducting layer 30 for protecting oxide superconducting layer 30. Protective layer 40 is made of Ag or an Ag alloy, for example. Protective layer 40 is not limited to this Ag protective layer, and a Cu protective layer made of Cu or a Cu alloy may be used instead of the Ag protective layer, for example.

A stacked body is formed of oriented metal substrate 10, intermediate layer 20, oxide superconducting layer 30 and protective layer 40 described above. Stabilizing layer 50 is then formed to cover the periphery of this stacked body. In the present embodiment, stabilizing layer 50 is formed to cover the outer periphery of the stacked body, that is, to cover almost the entire outermost surface of the stacked body. However, "the periphery of the stacked body" as used herein is not limited to the entire periphery, but may be only an upper main surface of the stacked body.

Stabilizing layer 50 is formed of foil or a plated layer of a metal material of good conductivity. The material forming stabilizing layer 50 is preferably Cu or a Cu alloy. Stabilizing layer 50 functions, together with protective layer 40, as a bypass in which the current of oxide superconducting layer 30 commutates during a transition of oxide superconducting layer 30 from the superconducting state to the normal conducting state.

As shown in FIG. 1, in oxide superconducting wire 1 according to the present embodiment, intermediate layer 20 interposed between oriented metal substrate 10 and oxide superconducting layer 30 is formed of a single layer.

Figure 2:
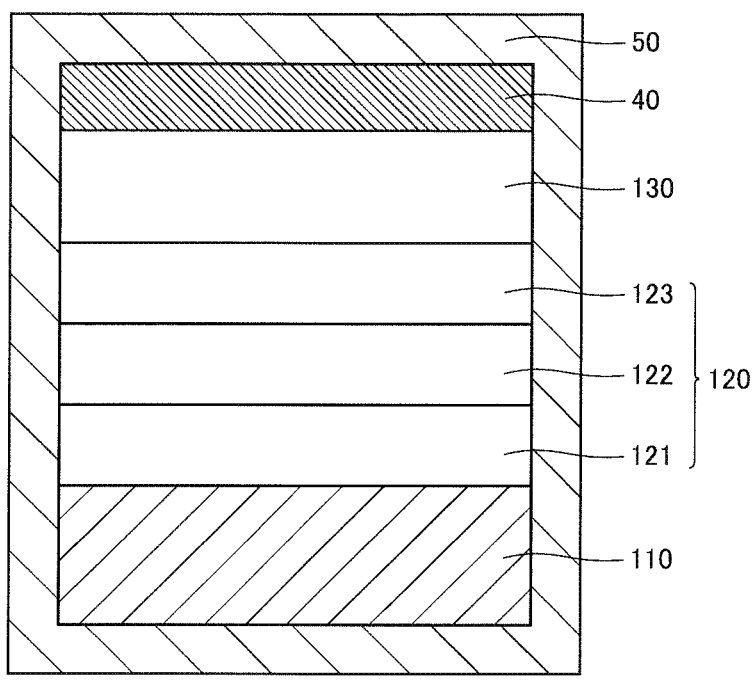
FIG. 2 is a schematic sectional view showing an arrangement of a conventional oxide superconducting wire.

Conventionally, an oxide superconducting wire having an intermediate layer formed of a plurality of layers has often been employed. FIG. 2 is a schematic sectional view showing an arrangement example of a conventional oxide superconducting wire. In the example of FIG. 2, the oxide superconducting wire includes an intermediate layer 120 having a three-layer structure. Specifically, intermediate layer 120 includes a $CeO_2$ layer 121, a YSZ layer 122 formed on $CeO_2$ layer 121, and a $CeO_2$ layer 123 formed on YSZ layer 122. $CeO_2$ layer 121 is a seed layer for forming a biaxially oriented ceramic layer on an oriented metal substrate 110. YSZ layer 122 is an anti-diffusion layer for preventing the diffusion of elements from oriented metal substrate 110 to an oxide superconducting layer 130. $CeO_2$ layer 123 is a lattice-matched layer between intermediate layer 120 and oxide superconducting layer 130 for growing c-axis oriented oxide superconducting layer 130.

In the oxide superconducting wire shown in FIG. 2, a good orientation is ensured by interposing intermediate layer 120 formed of a plurality of layers between oriented metal substrate 110 and oxide superconducting layer 130. On the other hand, in the step of forming intermediate layer 120, a $CeO_2$ layer forming step, a YSZ layer forming step and a $CeO_2$ layer forming step need to be successively performed to successively form $CeO_2$ layer 121, YSZ layer 122 and $CeO_2$ layer 123 on oriented metal substrate 110, thus adding to manufacturing cost.

The present inventors conducted research to reduce the thickness of an intermediate layer in terms of reducing the manufacturing cost. As a result, it was confirmed that the orientation of an oriented metal substrate affects the orientation of an intermediate layer, and that improving the orientation of the oriented metal substrate can form an intermediate layer having a good orientation even if the intermediate layer is formed of a single layer, and can prevent the diffusion of elements from the oriented metal substrate to an oxide superconducting layer.

Oxide superconducting wire 1 according to the present embodiment is based on the above findings, and can have a reduced thickness of intermediate layer 20 as compared to that of the conventional oxide superconducting wire shown in FIG. 2, by being able to form intermediate layer 20 formed of a single layer with a good orientation on oriented metal substrate 10 having a good orientation. Accordingly, the manufacturing cost can be reduced while excellent superconducting properties are maintained.

In the present embodiment, oriented metal substrate 10 preferably has an in-plane orientation $\Delta\phi$ of 7° or less. Oriented metal substrate 10 may more preferably have an in-plane orientation $\Delta\phi$ of 6° or less. In the present specification, the in-plane orientation of oriented metal substrate 10 can be evaluated by means of diffraction orientation measurement of a specific plane by X-ray diffraction (XRD).

In the XRD measurement, the RINT manufactured by Rigaku Corporation, for example, can be used as an X-ray generator. The K$\alpha$ line of Cu is used as an X-ray source. X rays are generated with an output of 40 kV and 40 mA.

The in-plane orientation $\Delta\phi$ of oriented metal substrate 10 can be determined from the FWHM of $\phi$ scan of a (111) plane of the main surface of oriented metal substrate 10. The FWHM of $\phi$ scan of the (111) plane of the main surface of oriented metal substrate 10 corresponds to the FWHM of an X-ray diffraction peak obtained when the (111) plane of oriented metal substrate 10 has a tilt of $\alpha=35°$ (FWHM of $\phi$ scan). An average value of the FWHMs of four $\phi$ scan peaks observed when $\alpha=35°$ is satisfied is represented as the in-plane orientation $\Delta\phi$. A smaller value of $\Delta\phi$ indicates a better orientation in the plane.

When measuring the in-plane orientation of oriented metal substrate 10 after the stacked body including oriented metal substrate 10, intermediate layer 20, oxide superconducting layer 30 and protective layer 40 has been formed, the degree of orientation of the surface of oriented metal substrate 10 can be measured by exfoliating protective layer 40 and oxide superconducting layer 30. The exfoliation of protective layer 40 can be performed, for example, by etching protective layer 40 with a mixed solution of a hydrogen peroxide solution and ammonia water. The exfoliation of oxide superconducting layer 30 can be performed, for example, by etching oxide superconducting layer 30 with nitric acid. Since intermediate layer 20 has a small thickness and allows X rays to pass therethrough, the measurement of the degree of orientation of oriented metal substrate 10 is not affected if intermediate layer 20 is not exfoliated.

When oriented metal substrate 10 has an in-plane orientation $\Delta\phi$ of 7° or less, even if the thickness of intermediate layer 20 formed of a single layer is reduced, lattice matching between oriented metal substrate 10 and oxide superconducting layer 30 can be relaxed, and the diffusion of elements (Ni, for example) between oriented metal substrate 10 and oxide superconducting layer 30 can be prevented. As a result, oxide superconducting layer 30 can be formed with a good orientation on intermediate layer 20 formed of a single-layer thin film, thereby achieving excellent superconducting properties of oxide superconducting wire 1.

When oriented metal substrate 10 has an in-plane orientation $\Delta\phi$ of more than 7°, on the other hand, it is difficult, when forming oxide superconducting layer 30 at high temperature, to prevent the diffusion of elements (Ni, for example) from oriented metal substrate 10 to oxide superconducting layer 30 by intermediate layer 20. As a result, the crystallinity (orientation and surface smoothness) of oxide superconducting layer 30 may be deteriorated, or a superconducting transition temperature (Tc) may be reduced. Such deterioration in crystallinity and reduction in Tc of oxide superconducting layer 30 result in deterioration in superconducting properties (reduction in Ic, for example) of oxide superconducting wire 1.

To prevent the diffusion of elements between oriented metal substrate 10 and oxide superconducting layer 30, there is no choice but to increase the thickness of intermediate layer 20 formed of a single layer, which may result in inability to produce the effect of reducing the manufacturing cost.

In the present embodiment, the thickness of intermediate layer 20 formed of a single layer is preferably 10 nm or more and 200 nm or less. When the thickness of intermediate layer 20 is 10 nm or more, intermediate layer 20 can perform the function of an anti-diffusion layer and a lattice-matched layer. When the thickness of intermediate layer 20 exceeds 200 nm, on the other hand, the effect of reducing the manufacturing cost is degraded. That is, when the thickness of intermediate layer 20 is 10 nm or more and 200 nm or less, the manufacturing cost can be reduced while a good crystallinity (orientation, surface smoothness and the like) of oxide superconducting layer 30 is achieved.

Furthermore, in the present embodiment, the in-plane orientation $\Delta\phi$ of intermediate layer 20 is preferably equal to or greater than the in-plane orientation $\Delta\phi$ of oriented metal substrate 10. A value obtained by dividing the difference between $\Delta\phi$ of intermediate layer 20 and $\Delta\phi$ of oriented metal substrate 10 by $\Delta\phi$ of oriented metal substrate 10, expressed in percentage, is preferably 15% or less.

However, the in-plane orientation $\Delta\phi$ of intermediate layer 20 is preferably 8° or less. This is because, when the in-plane orientation $\Delta\phi$ of intermediate layer 20 exceeds 8°, the thickness of intermediate layer 20 will be greater than 200 nm in order to obtain a good orientation in oxide superconducting layer 30 formed on intermediate layer 20.

(Method of Manufacturing Oxide Superconducting Wire)

Figure 3:
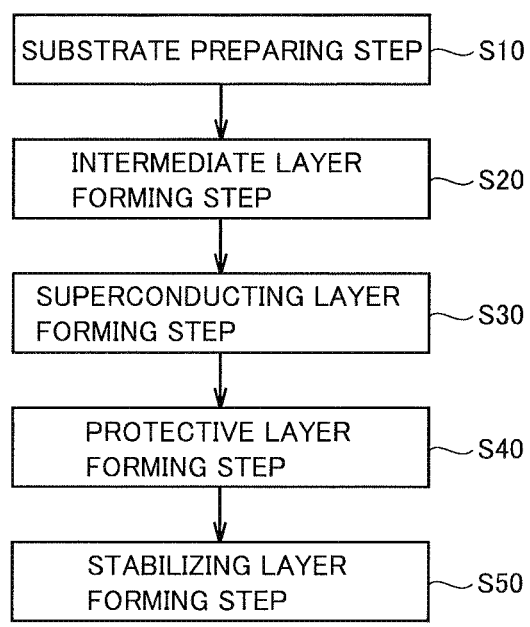
FIG. 3 is a flowchart showing a method of manufacturing the oxide superconducting wire according to the embodiment.
Figure 4:
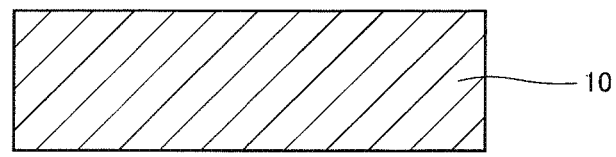
FIG. 4 is a schematic sectional view illustrating the method of manufacturing the oxide superconducting wire according to the embodiment.
Figure 5:
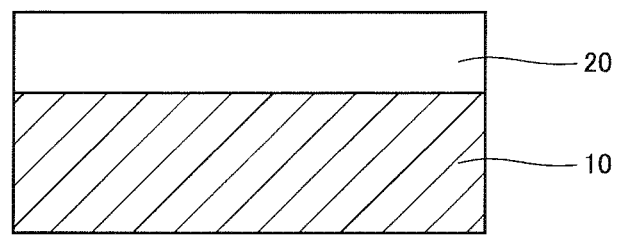
FIG. 5 is a schematic sectional view illustrating the method of manufacturing the oxide superconducting wire according to the embodiment.
Figure 6:
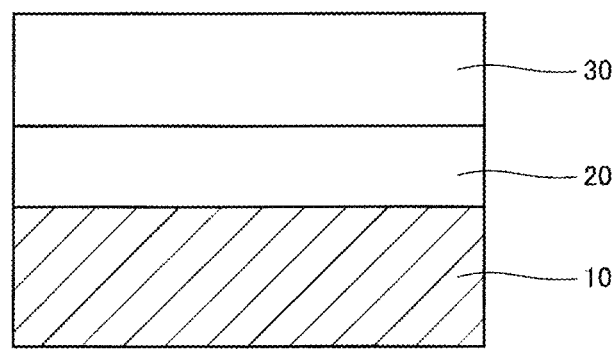
FIG. 6 is a schematic sectional view illustrating the method of manufacturing the oxide superconducting wire according to the embodiment.
Figure 7:
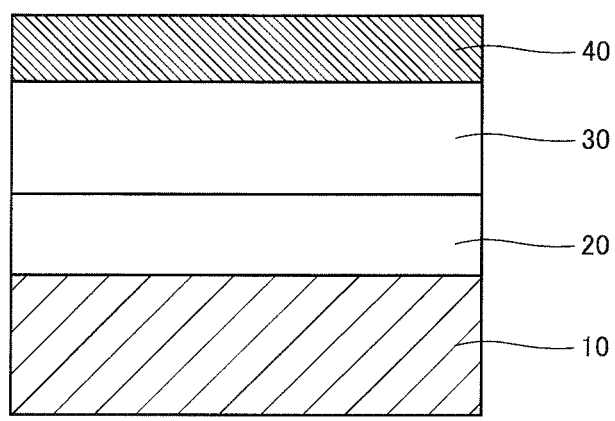
FIG. 7 is a schematic sectional view illustrating the method of manufacturing the oxide superconducting wire according to the embodiment.

Next, referring to FIGS. 3 to 7, a method of manufacturing the oxide superconducting wire according to the embodiment is described. FIG. 3 is a flowchart showing the method of manufacturing the oxide superconducting wire according to the embodiment.

Referring to FIG. 3, a substrate preparing step (S10) is performed first. Specifically, referring to FIG. 4, oriented metal substrate 10 is prepared. When oriented metal substrate 10 is a clad substrate having a non-oriented and non-magnetic metal such as SUS as a substrate, the bonding between the substrate and the orientated metal layer is performed by a method such as rolling.

Next, an intermediate layer forming step (S20 in FIG. 3) of forming intermediate layer 20 on oriented metal substrate 10 is performed. Specifically, referring to FIG. 5, intermediate layer 20 is formed on the main surface of oriented metal substrate 10. As a method of forming intermediate layer 20, a gas-phase method such as a sputtering method can be used, for example, but a metal organic decomposition (MOD) method may be used.

Next, a superconducting layer forming step (S30 in FIG. 3) of forming oxide superconducting layer 30 on intermediate layer 20 is performed. Specifically, referring to FIG. 6, oxide superconducting layer 30 made of a RE123-based oxide superconductor is formed on a main surface of intermediate layer 20 (upper main surface in FIG. 6) opposite to the main surface of intermediate layer 20 facing oriented metal substrate 10. As a method of forming oxide superconducting layer 30, any film forming method can be used, for example, a gas-phase method and a liquid-phase method, or a combination thereof. Examples of the gas-phase method include a pulsed laser deposition (PLD) method, a sputtering method, and an electron beam evaporation method. Examples of the liquid-phase method include a MOD method. When at least one of the laser deposition method, the sputtering method, the electron beam method and the MOD method is used, oxide superconducting layer 30 having a surface of excellent orientation and surface smoothness can be formed.

Next, a protective layer forming step (S40 in FIG. 3) of forming protective layer 40 on oxide superconducting layer 30 is performed. Specifically, referring to FIG. 7, protective layer 40 made of Ag or a Ag alloy is formed, by a physical vapor deposition method such as sputtering or an electroplating method, on a main surface of oxide superconducting layer 30 (upper main surface in FIG. 7) opposite to the main surface of oxide superconducting layer 30 facing intermediate layer 20. The surface of oxide superconducting layer 30 can be protected by forming protective layer 40. Subsequently, oxygen annealing is performed in which heat treatment is carried out under an oxygen atmosphere (oxygen introducing step), to introduce oxygen into oxide superconducting layer 30. By performing the aforementioned steps, the stacked body including intermediate layer 20, oxide superconducting layer 30 and protective layer 40 stacked in this order on oriented metal substrate 10 is formed.

Next, a stabilizing layer forming step (S50 in FIG. 3) of forming stabilizing layer 50 around the periphery of the stacked body is performed. Specifically, stabilizing layer 50 made of Cu or a Cu alloy is formed by a known plating method to cover the outer periphery of the stacked body, that is, to cover almost the entire outermost surface of the stacked body. Examples of a method of forming stabilizing layer 50 include a method of bonding copper foils, other than the plating method. By performing the aforementioned steps, oxide superconducting wire 1 shown in FIG. 1 is manufactured.

Figure 8:
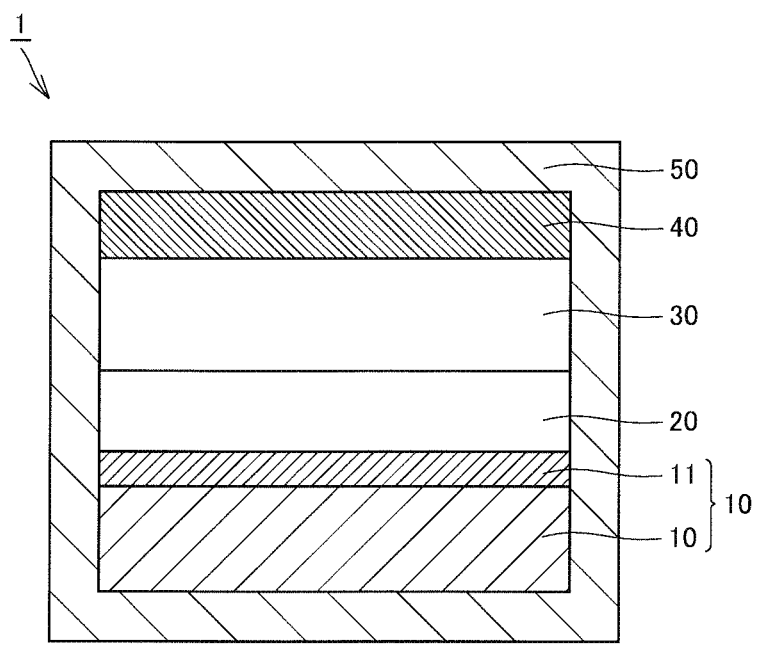
FIG. 8 is a schematic sectional view showing an arrangement of the oxide superconducting wire according to a variation of the embodiment.

Referring to FIG. 8, a variation of oxide superconducting wire 1 shown in FIG. 1 is described. Oxide superconducting wire 1 shown in FIG. 8 basically has a similar arrangement to that of oxide superconducting wire 1 shown in FIG. 1, except that the arrangement of oriented metal substrate 10 is different from that of oxide superconducting wire 1 shown in FIG. 1. In oxide superconducting wire 1 shown in FIG. 8, oriented metal substrate 10 includes an oxide layer 11 at a top portion in contact with intermediate layer 20. When a surface layer of oriented metal substrate 10 is a Ni layer, then oxide layer 11 is a NiO (nickel oxide) layer. Oxide layer 11 has a thickness of about from 10 to 200 nm. Oxide layer 11 is generated during the formation of intermediate layer 20, and may also be generated by heat treatment in an oxygen atmosphere in the superconducting layer forming step (S30 in FIG. 3).

Again, in oxide superconducting wire 1 shown in FIG. 8, intermediate layer 20 formed of a single-layer thin film and oxide superconducting layer 30 can be formed with a good orientation on oriented metal substrate 10. As a result, similar effects to those of oxide superconducting wire 1 shown in FIG. 1 can be obtained.

EXAMPLE

Next, the present invention will be specifically described based on an example.

(Samples)

The following samples were prepared in order to examine the effect of the orientation of oriented metal substrate 10 on an oxide superconducting wire. That is, samples (samples No. 1 to No. 13) in which an intermediate layer formed of a single layer and having a thickness of 5 to 300 nm was formed on an oriented metal substrate having an in-plane orientation $\Delta\phi$ of 5 to 8°, with an oxide superconducting layer formed on this intermediate layer, were prepared.

As the oriented metal substrate, a clad substrate having a stacked structure of Ni/Cu/SUS (samples No. 1 to No. 11) and a Ni—W alloy substrate (samples No. 12 and No. 13) were used. In the clad substrate of each of samples No. 1 to No. 11, the Ni layer had a thickness of 2 μm and the Cu layer had a thickness of 20 μm. In the Ni—W alloy substrate of each of samples No. 12 and No. 13, W had a composition ratio of 5 at % (atomic concentration).

X-ray diffraction analysis (φ scan) was performed on the oriented metal substrate for each sample, to measure the in-plane orientation $\Delta\phi$. As the intermediate layer, a $Y_2O_3$ layer having a thickness of 5 to 300 nm was formed on the oriented metal substrate using a sputtering method. Furthermore, as the oxide superconducting layer, a GdBCO layer having a thickness of 2500 nm was formed on the intermediate layer using a PLD method.

(Evaluation)

For each of the aforementioned samples No. 1 to No. 13, the superconducting property (Ic) was measured at liquid nitrogen temperature (77.3 K) under a self-magnetic field. Superconducting transition temperature Tc was measured by an induction method using the CryoScan device manufactured by THEVA. The results are shown in Table 1.

Next, a comparison between samples No. 3 and No. 6 in which $\Delta\phi$ of the oriented metal substrate is greater than 7° and which have different thicknesses of the intermediate layer shows that a higher Ic is obtained in sample No. 6 having a greater thickness of the intermediate layer than in sample No. 3 having a smaller thickness of the intermediate layer. It can thus be seen that, when $\Delta\phi$ of the oriented metal substrate is greater than 7°, the thickness of the intermediate layer must be increased in order to obtain a high Ic.

On the other hand, a comparison among samples No. 4, No. 5 and No. 12 in which $\Delta\phi$ of the oriented metal substrate is smaller than 7° and which have reduced thicknesses of the intermediate layer shows that, while Ic is reduced due to the reduction in Tc when the thickness is 5 nm (sample No. 4), high Ic and Tc are obtained when the thickness is 10 nm (samples No. 5 and No. 12).

Furthermore, a comparison among samples No. 1, No. 2, No. 5, and No. 8 to No. 13 in which $\Delta\phi$ of the oriented metal substrate is smaller than 7° shows that Ic is higher, which is more preferable, in samples No. 1 and No. 8 to No. 11 in which $\Delta\phi$ of the oriented metal substrate is smaller than 6°. In addition, a comparison among samples No. 1 and No. 8 to No. 11 in which $\Delta\phi$ of the oriented metal substrate is smaller than 6° shows that the high Ic is maintained even if the thickness of the intermediate layer is reduced from 1000 nm to 150 nm.

Lastly, a comparison between samples No. 5 and No. 12 in which $\Delta\phi$ of the oriented metal substrate is smaller than 7° and which have the same thickness of the intermediate layer shows that Ic is higher, which is more preferable, in sample No. 5 in which the oriented metal substrate is a clad substrate than in sample No. 12 in which the oriented metal

TABLE 1

| | Oriented Metal Substrate | Substrate $\Delta\phi$ (°) | Intermediate Layer Thickness (nm) | Intermediate Layer $\Delta\phi$ (°) | Ic (A/cm) | Tc (K) |
|---|---|---|---|---|---|---|
| Sample No. 1 | Ni/Cu/SUS | 5.4 | 150 | 5.3 | 520 | 93 |
| Sample No. 2 | Ni/Cu/SUS | 6.5 | 150 | 6.4 | 480 | 92 |
| Sample No. 3 | Ni/Cu/SUS | 7.3 | 150 | 7.5 | 350 | 89 |
| Sample No. 4 | Ni/Cu/SUS | 6.4 | 5 | 6.5 | 30 | 84 |
| Sample No. 5 | Ni/Cu/SUS | 6.6 | 10 | 6.5 | 470 | 92 |
| Sample No. 6 | Ni/Cu/SUS | 7.2 | 300 | 7.3 | 450 | 91 |
| Sample No. 7 | Ni/Cu/SUS | 6.3 | 150 | 8.2 | 300 | 92 |
| Sample No. 8 | Ni/Cu/SUS | 5.8 | 200 | 5.8 | 510 | 93 |
| Sample No. 9 | Ni/Cu/SUS | 5.5 | 500 | 5.4 | 510 | 92 |
| Sample No. 10 | Ni/Cu/SUS | 5.4 | 800 | 5.4 | 520 | 93 |
| Sample No. 11 | Ni/Cu/SUS | 5.5 | 1000 | 5.5 | 500 | 93 |
| Sample No. 12 | Ni-5 at % W | 6.9 | 10 | 7.1 | 400 | 90 |
| Sample No. 13 | Ni-5 at % W | 6.8 | 200 | 6.8 | 410 | 91 |

As shown in Table 1, $\Delta\phi$ of the oriented metal substrate is smaller than 7° in samples No. 1 to No. 13, except for samples No. 3 and No. 6. Of these, $\Delta\phi$ of the oriented metal substrate is smaller than 6° in samples No. 1 and No. 8 to No. 11.

First, samples No. 1 to No. 3 and No. 7 having the same thickness of the intermediate layer are compared. In sample No. 3 in which $\Delta\phi$ of the oriented metal substrate is greater than 7°, there is a reduction in Ic. In samples No. 1 and No. 2 in which $\Delta\phi$ of the oriented metal substrate is smaller than 7°, on the other hand, it can be seen that Ic and Tc are high, which is preferable. However, in sample No. 7 in which $\Delta\phi$ of the oriented metal substrate is 7° or less, but $\Delta\phi$ of the intermediate layer is higher than 8°, Tc has a high value but Ic has a somewhat low value.

substrate is a Ni—W alloy substrate. The same thing can be said for a comparison between samples No. 8 and No. 13. Therefore, it can be said that a clad substrate is more preferable for improvement in Ic.

In this manner, when the oriented metal substrate has an in-plane orientation $\Delta\phi$ of 7° or less, an oxide superconducting layer having a good orientation can be formed, even with an intermediate layer formed of a single-layer thin film. More preferably, the intermediate layer may have a thickness of 10 nm or more, and the intermediate layer may have an in-plane orientation $\Delta\phi$ of 8° or less. More preferably, the oriented metal substrate may have $\Delta\phi$ of 6° or less. More preferably, a clad substrate may be used as the oriented metal substrate. An oxide superconducting wire allowing for reduced manufacturing cost while maintaining excellent superconducting properties can thereby be obtained. As a result, the effect of improved mass production can be produced.

It should be understood that the embodiments and examples disclosed herein are illustrative and non-restrictive in every respect. The scope of the present invention is defined by the terms of the claims, rather than the embodiments and examples described above, and is intended to include any modifications within the scope and meaning equivalent to the terms of the claims.

REFERENCE SIGNS LIST

1 oxide superconducting wire; 10, 110 oriented metal substrate; 11 oxide layer; 20, 120 intermediate layer; 30, 130 oxide superconducting layer; 40 protective layer; 50 stabilizing layer; 121, 123 $CeO_2$ layer; 122 YSZ layer.

The invention claimed is:

1. An oxide superconducting wire comprising:
an oriented metal substrate;
an intermediate layer formed on the oriented metal substrate and being in contact with the oriented metal substrate; and
an oxide superconducting layer formed on the intermediate layer and being in contact with the intermediate layer,
the oriented metal substrate having an in-plane orientation ($\Delta\phi$) of 7° or less, and
the intermediate layer being formed of a single layer having a thickness of 10 nm or more and 200 nm or less,
wherein a value obtained by dividing a difference between an in-plane orientation of the intermediate layer and the in-plane orientation of the oriented metal substrate by the in-plane orientation of the oriented metal substrate, expressed as a percentage, is 15% or less.

2. The oxide superconducting wire according to claim 1, wherein the intermediate layer has an in-plane orientation of 8° or less.

3. The oxide superconducting wire according to claim 2, wherein the oriented metal substrate includes an oxide layer at a top portion in contact with the intermediate layer.

4. The oxide superconducting wire according to claim 1, wherein the intermediate layer has a thickness of 10 nm or more.

5. The oxide superconducting wire according to claim 4, wherein the intermediate layer has an in-plane orientation of 8° or less.

6. The oxide superconducting wire according to claim 4, wherein the oriented metal substrate includes an oxide layer at a top portion in contact with the intermediate layer.

7. The oxide superconducting wire according to claim 1, wherein
the oriented metal substrate is a clad substrate.

8. The oxide superconducting wire according to claim 7, wherein the intermediate layer has an in-plane orientation of 8° or less.

9. The oxide superconducting wire according to claim 7, wherein the oriented metal substrate includes an oxide layer at a top portion in contact with the intermediate layer.

10. The oxide superconducting wire according to claim 1, wherein the oriented metal substrate includes an oxide layer at a top portion in contact with the intermediate layer.

\* \* \* \* \*